United States Patent

Rick

(10) Patent No.: US 8,534,700 B2
(45) Date of Patent: Sep. 17, 2013

(54) AIRBAG SYSTEM FOR A MOTOR VEHICLE

(75) Inventor: Ulrich Rick, Braunweiler (DE)

(73) Assignee: GM Global Technology Operations LLC, Detroit, MI (US)

( * ) Notice: Subject to any disclaimer, the term of this patent is extended or adjusted under 35 U.S.C. 154(b) by 36 days.

(21) Appl. No.: 13/207,087

(22) Filed: Aug. 10, 2011

(65) Prior Publication Data

US 2012/0038134 A1 Feb. 16, 2012

(30) Foreign Application Priority Data

Aug. 12, 2010 (DE) .......................... 10 2010 034 113

(51) Int. Cl.
*B60R 21/213* (2011.01)
*B60R 21/232* (2011.01)
*B60R 21/233* (2006.01)

(52) U.S. Cl.
USPC ................... 280/730.1; 280/729; 280/730.2

(58) Field of Classification Search
USPC .................... 280/729, 730.1, 730.2, 743.1
See application file for complete search history.

(56) References Cited

U.S. PATENT DOCUMENTS

| | | | |
|---|---|---|---|
| 3,804,435 A * | 4/1974 | See et al. .................. | 280/733 |
| 5,470,103 A * | 11/1995 | Vaillancourt et al. ...... | 280/730.1 |
| 6,123,355 A * | 9/2000 | Sutherland ................. | 280/728.2 |
| 6,457,740 B1 * | 10/2002 | Vaidyaraman et al. .... | 280/730.2 |
| 6,457,742 B1 * | 10/2002 | Brucker .................... | 280/730.2 |
| 6,489,006 B1 * | 12/2002 | Keshavaraj ................ | 428/125 |
| 6,702,320 B1 * | 3/2004 | Lang et al. ................ | 280/729 |
| 7,134,683 B2 | 11/2006 | Bendig et al. | |
| 7,398,993 B2 * | 7/2008 | Siegel ....................... | 280/730.2 |
| 2006/0017267 A1 * | 1/2006 | Fink .......................... | 280/730.2 |
| 2006/0097491 A1 * | 5/2006 | Saberan et al. ........... | 280/730.1 |
| 2007/0080522 A1 * | 4/2007 | Sugimoto et al. ......... | 280/730.1 |
| 2007/0145726 A1 * | 6/2007 | Ochiai et al. ............. | 280/730.2 |
| 2008/0238045 A1 * | 10/2008 | Garner ...................... | 280/728.2 |
| 2009/0212537 A1 * | 8/2009 | Slaats et al. .............. | 280/728.2 |

FOREIGN PATENT DOCUMENTS

| | | | |
|---|---|---|---|
| DE | 10246545 A1 | | 4/2004 |
| DE | 102004056029 A1 | * | 12/2005 |
| DE | 102004061898 A1 | | 7/2006 |
| DE | 102007028803 A1 | | 12/2008 |
| WO | WO 2008059719 A1 | * | 5/2008 |

OTHER PUBLICATIONS

Chamber Definition, Merriam-Webster's Online Dictionary, available at http://www.merriam-webster.com/dictionary/chamber (last visited Mar. 4, 2013).*
German Patent Office, German Search Report for German Application No. 102010034113.4, dated Jun. 29, 2011.

* cited by examiner

*Primary Examiner* — Joseph Rocca
(74) *Attorney, Agent, or Firm* — Ingrassia Fisher & Lorenz, P.C.

(57) ABSTRACT

An airbag system is provided for a motor vehicle with a first and second inflatable protective chamber, which when inflated form an angle with each other. The first and second protective chambers are linked to each other and/or to a gas feed along one side; and/or that a third inflatable protective chamber is provided, which when inflated forms an angle with the first and second protective chambers.

11 Claims, 1 Drawing Sheet

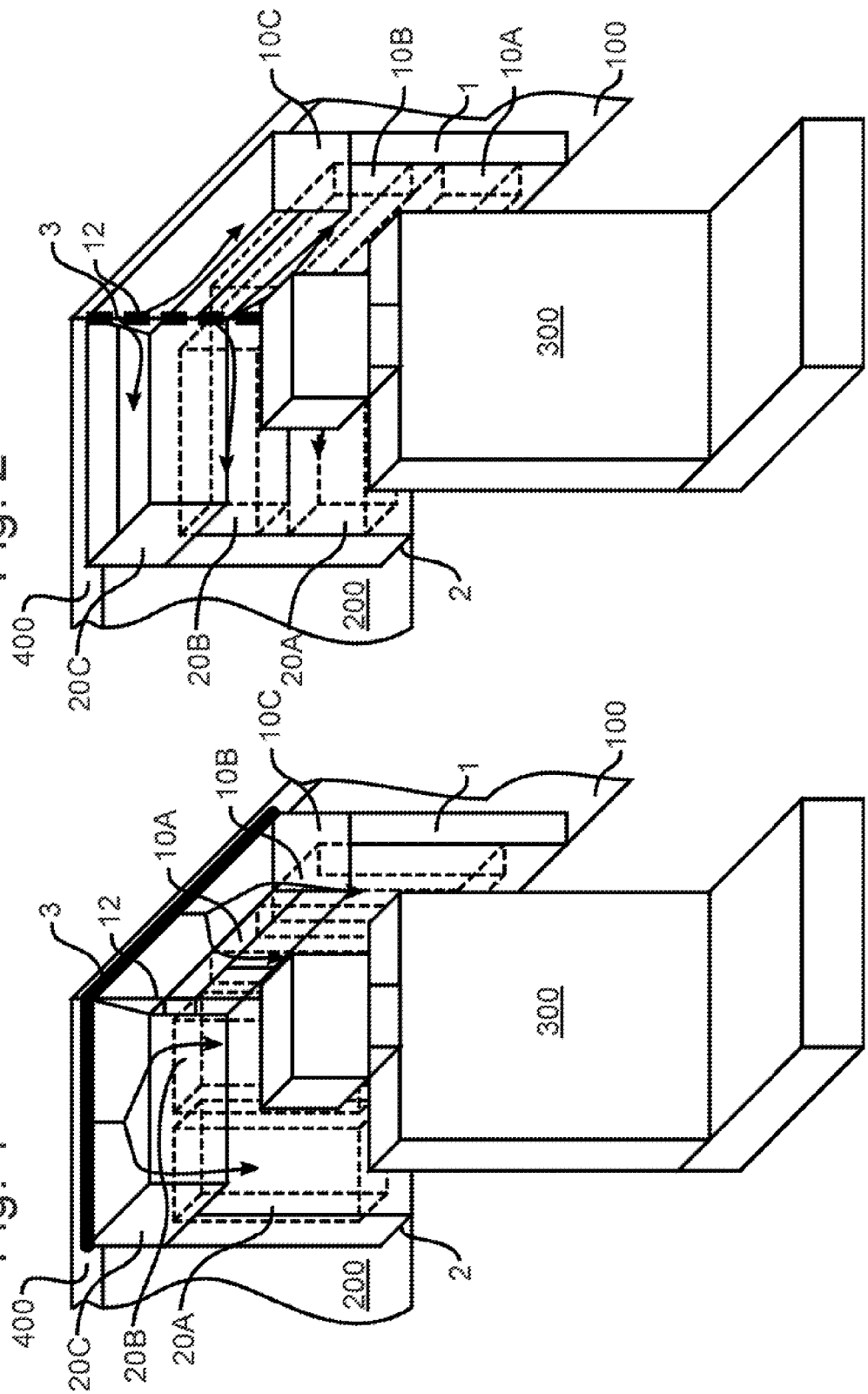

AIRBAG SYSTEM FOR A MOTOR VEHICLE

CROSS-REFERENCE TO RELATED APPLICATION

This application claims priority to German Patent Application No. 102010034113.4, filed Aug. 12, 2010, which is incorporated herein by reference in its entirety.

TECHNICAL FIELD

The present invention relates to an airbag system for a motor vehicle with a first and second inflatable protective chamber, which when inflated form an angle with each other, a motor vehicle with such an airbag system, as well as a method for inflating such an airbag system.

BACKGROUND

As a result of conceptual and packaging considerations, in particular vehicles with three rows of seats and micro-vehicles with a small rear overhang have an interior with reduced dimensions. In particular, this decreases the distance for (rear) passengers, especially in terms of headroom in relation to the vehicle structure, windows and trim panel sections. Given a rear impact with and without lateral energy input, the passengers can hence make contact with hard structural or trim panel sections, as well as windows of the vehicle.

Known from DE 102 46 545 A1 is an airbag system with two inflatable protective chambers, which are accommodated in the side or rear roof area, and from there deploy in front of the rear side window or rear window, so as to at least partially cover the latter. The two protective chambers are separately configured to each cling tightly to the side and rear windows. They are filled by a shared gas generator via a horizontal gas feed, so as to consequently deploy in a vertical direction from above in front of the side and rear window. Various aspects of this airbag system can be improved.

Therefore, at least one object is to improve the protection offered to vehicle passengers by an airbag system. In addition, other objects, desirable features and characteristics will become apparent from the subsequent summary and detailed description, and the appended claims, taken in conjunction with the accompanying drawings and this background.

SUMMARY

The airbag system according to an embodiment for a motor vehicle exhibits at least a first and second inflatable protective chamber, which when inflated form an angle with each other, which preferably is greater than approximately 45°, in particular greater than approximately 60°, and/or less than approximately 135°, in particular less than approximately 120°, and preferably is essentially equal to approximately 90°.

These first and second protective chambers are linked together along a side that at least essentially is arranged parallel to a B- or C-column of the motor vehicle in a preferred embodiment. This linkage can preferably take place at several spaced apart, discrete points or areas, or also essentially in an uninterrupted or continuous manner. In particular, the first and second protective chamber can be designed as a single piece with each other and, in a preferred embodiment, be defined by one or more seams. In terms of the present invention, a seam is here understood to be two or more layers joined by a thread material, but can also include an adhesive seam and other, preferably firmly bonded joints. In this regard, a linkage in the mechanical sense is understood in particular as a possibly integral, mutual attachment to each other.

By linking the first and second protective chambers, which together form an angle, one of the two protective chambers can additionally stabilize the other, in particular given an impact involving the vehicle passengers. For example, if inertia causes the head and/or upper thorax of a vehicle passenger to hit a laterally arranged protective chamber during a collision from the side, the latter can be further stabilized by the linked rear protective chamber. In addition, the deployment characteristics can be improved in this way. The linked protective chambers can advantageously absorb an impact involving the vehicle passengers in the linkage area, i.e., along the side, which can happen in particular as the result of an angular impact.

In order to increase the protective effect, an embodiment provides that a protective chamber entirely or partially cover a roof area of the motor vehicle when inflated. In particular, the roof area can encompass an upper area of a rear and/or side window, a roof frame and/or an area of the vehicle roof bordering the roof frame. The protective chamber covering the roof area can be the first and/or second protective chamber. In a preferred embodiment, a third protective chamber at least partially covers the roof area of the motor vehicle when inflated.

In a second embodiment that can preferably be combined with the first aspect described above, such a third protective chamber forms an angle with the first and/or second protective chamber, and is linked to the latter in a preferred further development. As described above in relation to the first aspect, this linkage can also take place at discrete points or areas, or at least regionally be uninterrupted or continuous in design. The angle formed in an inflated state by the third protective chamber with the first and/or second protective chamber is preferably greater than approximately 45°, in particular greater than approximately 60°, and/or is preferably less than approximately 135°, in particular less than approximately 120°, and preferably essentially is equal to approximately 90°.

In this way, a rear, upper corner of a passenger compartment can be completely or at least partially covered according to the second aspect, which increases the protective effect, in particular in the event of a rollover. Additionally or alternatively to in particular a third protective chamber for covering a roof area, one or more additional protective chambers can be respectively provided, so as to entirely or partially cover a side and/or rear area of the motor vehicle when inflated, wherein these additional protective chambers can in a preferred embodiment again be linked at discrete points or areas or at least essentially in an uninterrupted or continuous manner to each other or one of the first and second protective chambers, and if needed to a third protective chamber.

In a third which, which preferably can be combined with the first and/or second aspect described above, the first and second protective chambers are linked along one side to a gas feed, which in a preferred embodiment is at least essentially arranged parallel to a B- or C-column of the motor vehicle. Such a gas feed makes it possible in particular to improve the deployment of protective chambers during inflation by comparison to known prior art. When the gas feed and/or uninflated first and/or second protective chamber are entirely or partially arranged on the B- or C-column of the motor vehicle in a preferred embodiment, in particular at least partially incorporated into the latter, i.e., the gas feed extends at least essentially in a vertical direction, an at least essentially horizontal protective chamber deployment takes place, for example, proceeding from the B- or C-column. This can be advantageous in particular in the tight installation situations in the rear passenger compartment described at the outset, for example to diminish or eliminate an impediment to the deploying protective chambers posed by headrests or the like. In addition, filling can take place faster by way of a gas feed linked to the two protective chambers along an entire side.

A gas feed can in particular exhibit or consist of a distribution pipe or hose. Similarly, it can also exhibit or consist of a gas generator, in particular a tubular gas generator. An embodiment provides a gas feed device for inflating one or more of the protective chambers described above, which in addition to a gas generator and a possible distribution pipe or hose can in particular encompass a control means. In an embodiment, such a control means can exhibit one or more valve systems, ignition systems and/or data processors, in particular microcontrollers.

In an embodiment, one or more of the aforementioned protective chambers are each selectively inflated. For example, this makes it possible, in particular according to the third embodiment, to only inflate one or more protective chambers that entirely or at least partially cover a rear area of the motor vehicle, in particular a rear window, when inflated. When a side impact is detected, one or more protective chambers that entirely or partially cover a side area, in particular a side window, of the motor vehicle can correspondingly be inflated. Given an angular impact in which the vehicle is exposed to significant accelerations in the longitudinal and transverse directions, protective chambers that at least partially cover both the rear and side areas can be inflated. In particular, when a rollover is detected, a protective chamber that at least partially covers a roof area of the motor vehicle when inflated can additionally or exclusively be inflated.

Similarly, however, in particular according to the first and second embodiment, several protective chambers, in particular protective chambers that form an angle with each other, can be inflated independently of the type, in particular direction, of the accident detected. Especially with respect to the first and second aspects, however, several protective chambers that form an angle with each other can in like manner also be inflated independently of the type, in particular direction, of the detected accident.

Two or more protective chambers can each be joined together, in particular in pairs, by means of a tear seam, and open either entirely or at least regionally when a specific fill pressure, volume and/or pressure surge has been exceeded, thereby fluidically joining the corresponding protective chambers. In particular, it is possible to join together two or more protective chambers to cover a rear area, two or more protective chambers to cover a side area, and/or one or more protective chambers to cover a roof area.

In an embodiment, selectively controlling the gas filling process in an appropriate manner makes it possible to activate different protective chambers in this way, for example by optionally filling a protective chamber with a gas volume that bursts or does not burst a tear seam to another protective chamber. Two or more, in particular all, protective chambers are designed as a single piece in a preferred embodiment. To this end, the protective chambers can in particular be defined by seams, which here refer in particular to firmly bonded connections established by adhesive bonding, stitching, and the like, between two or more layers, wherein the layers define the corresponding protective chambers between themselves and these seams.

BRIEF DESCRIPTION OF THE DRAWINGS

The present invention will hereinafter be described in conjunction with the following drawing figures, wherein like numerals denote like elements, and:

FIG. 1 is part of a motor vehicle with an airbag system according to a first embodiment, perspective view; and FIG. 2 is part of a motor vehicle with an airbag system according to a second embodiment, view as in FIG. 1.

DETAILED DESCRIPTION

The following detailed description is merely exemplary in nature and is not intended to limit application and uses. Furthermore, there is no intention to be bound by any theory presented in the preceding background or summary or the following detailed description.

In a perspective view of the rear, upper corner of the passenger compartment as seen from the passenger compartment, FIG. 1 shows part of a motor vehicle with an airbag system according to a first embodiment. Visible in the foreground is a vehicle seat 300, which can involve the rear seat of a vehicle with two, three or more rows of seats, for example, but also the seat in a micro-vehicle with only one or two seats. A side area 100 with a side window (not shown) is visible on the right side, while a rear area 200 with a rear window (also not shown) is visible in the rear area. The side and rear areas are upwardly bound by a roof frame 400, which abut the vehicle roof (not shown).

The roof area 400 accommodates a gas feed in the form of an angular, horizontally arranged gas distribution pipe 3, and when inactivated and rolled up, an airbag with two sections 1, 2 designed as a single piece together. Two protective chambers 10A, 10B or 20A, 20B are respectively defined in the two airbag sections 1, 2, and essentially extend vertically downward when inflated. These protective chambers each communicate with the upper protective chamber 10C or 20C, which extends essentially horizontally in front of the roof frame 400 when inflated.

The airbag with its two sections 1, 2 is designed as a single piece by means of two respectively single or multi-ply layers, which are joined together along adhesive joints, in order to define the protective chambers 10A, . . . , 20C denoted by dashed lines on FIG. 1. As a result, in particular the two protective chambers 10A, 20B that form an essentially right angle with each other are linked together. In turn, the latter are linked to the upper protective chambers 10C or 20C, which extend further into the vehicle passenger compartment as only suggested on FIG. 1, so as to at least partially also cover the roof area. The airbag system hence covers in particular the rear, upper corner of the vehicle passenger compartment visible on the top right of FIG. 1, as well as the B- or C-column.

When activated as the result of a rear or side impact, for example acquired by acceleration sensors, but also in response to a combined rear and side, i.e., angular, impact, as well as given a rollover, a gas generator (not shown) fills the individual protective chambers 10A, . . . , 20C via the gas feed 3, as denoted on FIG. 1 by flow arrows. In the process, the airbag sections 1, 2 or the protective chambers 10A, . . . , 20C formed therein deploy essentially vertically downward.

The linkage, in particular between the two chambers 10A, 20B, which together form an angle with each other and cover the B- or C-column 12, causes the two airbag areas 1, 2 to mutually support each other. They are also stabilized by the linked upper protective chambers 10C, 20C, which by also covering a part of the roof, in turn completely cover the upper, inner corner of the passenger compartment, thereby protecting a vehicle passenger in the event of an angular impact or rollover.

FIG. 2 presents a view corresponding to FIG. 1 of part of a vehicle interior with an airbag system according to a second embodiment of the present invention. The same elements are labeled with the same reference numbers, so that only the differences will be touched upon below. In the second embodiment, the gas feed, i.e., the distribution pipe 3, is essentially arranged vertically along the B- or C-column 12 or incorporated into the latter. Linked to this gas feed 3 on either side are the airbag sections 1, 2, which hence are in turn secured to each other. In turn, the latter define protective chambers 10A, . . . , 20B, which as opposed to the first embodiment, essentially extend in a vertical direction into the airbag sections 1, 2. The upper protective chambers 10C, 20C in turn extend into the vehicle passenger compartment when inflated, as only suggested on FIG. 2, so as to cover part of the roof area, and hence completely cover in particular the rear, upper corner of the vehicle compartment, along with the protective chambers 10B, 20B.

As in turn denoted by the flow arrows, the gas feed 3 inflates the individual protective chambers 10A, . . . , 20C, which in the process deploy from a folded state in which they are accommodated in the B- or C-column 12 in essentially a horizontal direction in back or to the side of the seat 300. As in the first embodiment, it can here also be provided that some of the protective chambers 10A, . . . , 20C of adjacent protective chambers initially be separately defined in particular by adhesively bonded tear seams, which tear open over their lengths at a corresponding gas volume, pressure and pressure surge from the gas feed 3, thereby merging the chambers together.

In particular, the individual protective chambers 10A, . . . , 20C can be inflated selectively as a function of a detected accident. In particular by correspondingly controlling the gas feed 3 (not shown), for example, the protective chambers 20A, 20B can (also) always be filled given a large enough impact in the longitudinal direction of the vehicle, the chambers 10A, 10B can (also) always be filled given a large enough impact in the transverse direction of the vehicle, and in particular in the second embodiment, the upper protective chambers 10C, 20C can (also) always be filled given a rotation around a longitudinal or transverse axis of the vehicle, i.e., in the event of a detected rollover.

The angular airbag system, which when inflated envelops the entire rear inner vehicle corner, hence offers potential protection during both a rear and side, as well as a combined angular crash or impact. As a consequence, (also) inflating the side protective chambers 10A, . . . , 10C affords the vehicle passengers better protection given a lateral energy input despite a detected impact in the longitudinal direction of the vehicle recognized as a rear impact.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An airbag system for a motor vehicle, comprising:
a first inflatable protective chamber;
a second inflatable protective chamber that when inflated forms a first angle with the first inflatable protective chamber;
a gas feed linking the first inflatable protective chamber and the second inflatable protective chamber along one side; and
a third inflatable protective chamber that when inflated forms a second angle with the first inflatable protective chamber and forms a third angle with the second inflatable protective chamber, and that when inflated does not extend past a centerline of a vehicle seat.

2. The airbag system according to claim 1, wherein the third inflatable protective chamber is configured to at least partially cover a roof area of the motor vehicle when inflated.

3. The airbag system according to claim 1, wherein the first inflatable protective chamber is linked to at least one additional protective chamber so as to at least partially cover an area of the motor vehicle when inflated.

4. The airbag system according to claim 1, wherein the second inflatable protective chamber is linked to at least one additional protective chamber so as to at least partially cover an area of the motor vehicle when inflated.

5. The airbag system according to claim 1, wherein the gas feed is configured to selectively inflate the first inflatable protective chamber.

6. The airbag system according to claim 5, wherein the gas feed is configured to selectively respond to a rear impact.

7. The airbag system according to claim 1, further comprising a fourth inflatable protective chamber that when inflated forms a fourth angle with the first inflatable protective chamber and forms a fifth angle with the second inflatable protective chamber.

8. A motor vehicle, comprising:
an airbag system, comprising:
a first inflatable protective chamber;
a second inflatable protective chamber that when inflated forms a first angle with the first inflatable protective chamber;
a gas feed linking the first inflatable protective chamber and the second inflatable protective chamber along one side; and
a third inflatable protective chamber that when inflated forms a second angle with the first inflatable protective chamber and forms a third angle with the second inflatable protective chamber, and that when inflated does not extend past a centerline of a vehicle seat; and
a column;
wherein the first inflatable protective chamber and the second inflatable protective chamber are linked together and are linked to the gas feed along the one side, wherein the one side is at least essentially arranged parallel to the column of the motor vehicle,
wherein the airbag system is configured to at least partially cover a rear, upper corner of a passenger compartment when inflated.

9. The motor vehicle according to claim 8, wherein the gas feed is arranged at least partially on the column of the motor vehicle.

10. The motor vehicle according to claim 8, wherein the first inflatable protective chamber is arranged at least partially on the column of the motor vehicle.

11. The motor vehicle according to claim 8, wherein the second inflatable protective chamber is arranged at least partially on the column of the motor vehicle.

* * * * *